United States Patent [19]

Hirota et al.

[11] Patent Number: 4,482,934

[45] Date of Patent: Nov. 13, 1984

[54] TEMPERATURE COMPENSATING TITANATE CERAMIC CAPACITOR WITH NICKEL OR COPPER ELECTROLESS METAL ELECTRODES

[75] Inventors: Toshiharu Hirota, Hikone; Osamu Kano, Nagaokakyo; Yoshiharu Kato, Takatsuki, all of Japan

[73] Assignee: Murata Manufacturing Co., Ltd., Japan

[21] Appl. No.: 516,744

[22] Filed: Jul. 25, 1983

[30] Foreign Application Priority Data

Jul. 26, 1982 [JP] Japan .................................. 57-130886

[51] Int. Cl.$^3$ ............................................. C04B 35/46
[52] U.S. Cl. ..................................... 361/321; 361/305; 501/136
[58] Field of Search ................ 501/136; 361/321, 305; 427/79

[56] References Cited

U.S. PATENT DOCUMENTS

| | | | |
|---|---|---|---|
| 3,951,873 | 4/1976 | Kikuchi et al. | 501/137 |
| 4,017,320 | 4/1977 | Fujiwara et al. | 501/136 |
| 4,073,846 | 2/1978 | Masumura et al. | 501/136 |
| 4,388,416 | 6/1983 | Sakabe et al. | 361/321 |

FOREIGN PATENT DOCUMENTS 53-114812  10/1978  Japan .................................. 501/136

Primary Examiner—Helen M. McCarthy
Attorney, Agent, or Firm—Ostrolenk, Faber, Gerb & Soffen

[57] ABSTRACT

A ceramic dielectric composition for temperature compensating capacitors comprising 64–70.5% by weight of $SrTiO_3$, 28–34% by weight of $CaTiO_3$ and 1.5–4.5% by weight of $Bi_2O_3$ or $Bi_2O_3.nTiO_2$ (where n=1 to 5). Not more than 10% by weight of $MgTiO_3$ may be added, as necessary. The composition has high dielectric constant above 235 and Q above 2000 and low temperature coefficient of a dielectric constant up to $-1000 \times 10^{-6}/°C$. The ceramic element obtained by the composition has a large adhesion strength to electroless plating electrodes (nickel or copper).

14 Claims, 5 Drawing Figures

TEMPERATURE COMPENSATING TITANATE CERAMIC CAPACITOR WITH NICKEL OR COPPER ELECTROLESS METAL ELECTRODES

BACKGROUND OF THE INVENTION

1. Field of the Invention

The present invention relates to a ceramic dielectric composition for temperature for compensation.

2. Description of the Prior Art

Japanese Patent Publication No. 17771/1981 of the Japanese patent application filed in the name of TDK Electronics Company Inc., Tokyo, Japan, discloses a composition of $SrTiO_3$—$CaTiO_3$—$Nb_2O_5$ system by way of an example of a ceramic dielectric composition for temperature compensation exhibiting electrical characteristics of a dielectric constant of larger than 200, the temperature coefficient of a dielectric constant of up to $-1000 \times 10^{-6}/°C$. and quality factor (Q) of larger than 1000.

It has already been reported that such system exhibits electrical characteristics of the dielectric constant being 200 to 320 and of the quality factor being in the range of 1500 to 5000, in the range of the temperature coefficient of a dielectric constant of $-1000 \times 10^{-6}/°C$. to $-3000 \times 10^{-6}/°C$.

In addition, it has been confirmed that such system exhibits characteristics in which the dielectric constant is decreased in the ranges of 50 to 80% by weight of $SrTiO_3$ and of 20 to 50% by weight of $CaTiO_3$ in terms of proportion of $SrTiO_3$—$CaTiO_3$ which is a principal constituent of the system, while the quality factor is increased as the temperature coefficient of a dielectric constant is decreased.

Generally, the electric characteristic of a ceramic capacitor is shown by the values by measurement of a sample of a ceramic element having electrodes of fired silver. The above described system is not an exception to the same and measurement has been made upon formation of electrodes of fired silver.

However, in view of the fact that the recent rise of the cost of silver per se has increased the cost of capacitors, ceramic capacitors using a base metal, such as nickel, copper or the like, cheaper than silver have been put into practical use. Usually, electrodes of a base metal are formed by an electroless plating method.

Accordingly, formation of electrodes by an electroless plating method on a ceramic element of the above described $SrTiO_3$—$CaTiO_3$—$Nb_2O_5$ system can be readily considered. However, formation of electrodes of nickel or copper by an electroless plating method on a ceramic capacitor element made of such system has revealed a large difference, as compared with a sample having electrodes of fired silver. More specifically, although the quality factor has been in the range of 1500 to 5000 according to a sample having silver electrodes, the quality factor of a sample having nickel or copper electrodes remains as low as 200 at the most, revealing that an element which has electrodes formed by an electroless plating method can be hardly put into practical use. Therefore, in formation of electrodes a combination of a ceramic element with electrodes need be taken into consideration and, failure in formation of inexpensive electrodes by an electroless plating method is incompatible with cost reduction.

In the light of the foregoing, even when a ceramic element for capacitors having excellent electric characteristics can be obtained, it is undesirable that the ceramic element brings about degradation of electric characteristics in the case of electrodes of electroless plating. Therefore, it is desired that a ceramic element brings about no degradation of electric characteristics irrespective of whether electrodes are of fired silver or of an electroless plating method.

SUMMARY OF THE INVENTION

Accordingly, a principal object of the present invention is to provide a ceramic dielectric composition for temperature compensation comprising a composition system satisfying the above described requirement.

The present invention comprises a composition system including $SrTiO_3$—$CaTiO_3$—$Bi_2O_3$ or —$Bi_2O_3.nTiO_2$ (where n=1 to 5), to which $MgTiO_3$ is added as necessary.

More specifically, the present invention comprises 64 to 70.5% by weight of $SrTiO_3$, 28 to 34% by weight of $CaTiO_3$, and 1.5 to 4.5% by weight of $Bi_2O_3$ or $Bi_2O_3.nTiO_2$. Not more than 10% by weight of $MgTiO_3$ may be further added, as necessary.

The reason for the above described limitation to the ranges of composition will be described in the following. If and when $SrTiO_3$ is less than 64% by weight and $CaTiO_3$ is more than 34% by weight, the temperature coefficient of a dielectric constant goes too much in the minus direction. On the other hand, if and when $SrTiO_3$ is more than 70.5% by weight and $CaTiO_3$ is less than 28% by weight, the temperature coefficient of a dielectric constant also becomes large in the minus direction. If and when $Bi_2O_3$ or $Bi_2O_3.nTiO_2$ is less than 1.5% by weight, sintering is difficult and both the dielectric constant and the quality factor become small and the temperature coefficient of a dielectric constant becomes large in the minus direction, whereas if and when the same is larger than 4.5% by weight, a preferred temperature coefficient of a dielectric constant is exhibited but the quality factor is decreased and a needle-like crystal appears on the surface of a ceramic element, with the result that the adhesive strength between the surface of ceramic and electroless plating layers as electrodes is decreased. If and when n becomes larger than 5, production of a needle-like crystal is suppressed but an increasing effect of a dielectric constant becomes lost. If and when $MgTiO_3$ is added, the temperature coefficient of a dielectric constant becomes small and sintering becomes easy; however, if $MgTiO_3$ becomes more than 10% by weight, the dielectric constant becomes low.

DESCRIPTION OF THE PREFERRED EMBODIMENTS

Figure 1:
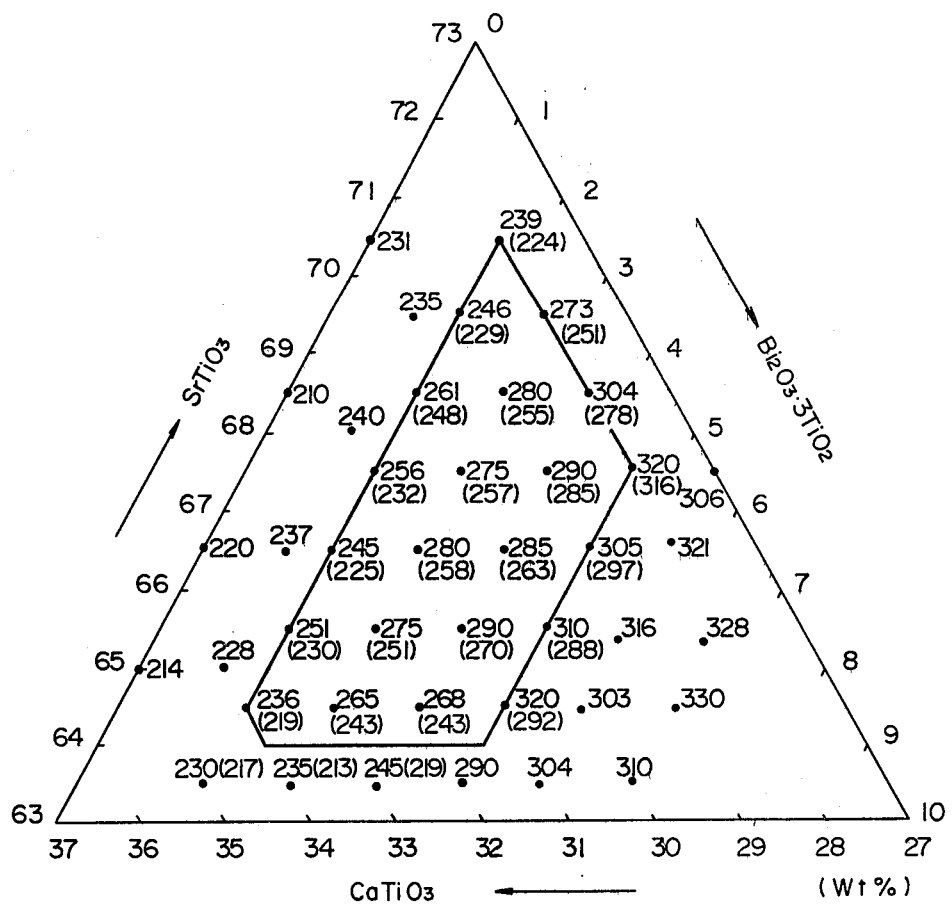
FIG. 1 is a triangular diagram showing a dielectric constant ($\epsilon$) at the respective composition points in a composition including $SrTiO_3$—$CaTiO_3$—$Bi_2O_3.3TiO_2$.

Now the present invention will be described further in detail in the following by referring to the embodiments.

$SrCO_3$, $CaCO_3$, $TiO_2$, $Bi_2O_3$, $MgCO_3$ were used as raw materials. Then $SrTiO_3$, $CaTiO_3$, $MgTiO_3$ were in advance prepared and these were mixed with $Bi_2O_3$, $TiO_2$ to provide ceramics of compositions shown in Table 1, whereupon the mixed raw materials were milled by a wet process together with a binder and the mixture was dehydrated and dried. The powders thus obtained were formed into discs of 10 mm in diameter and 0.5 mm in thickness under pressure of 500 kg/cm². Then the compact thus obtained was fired for one hour in a natural atmosphere at the temperature of 1250° to 1400° C.

The ceramic thus obtained was rinsed and etched and sensitized and then activated, whereupon the same was dipped in a nickel plating bath, whereby electroless nickel plating electrodes were formed on the surface. Since an unnecessary plating layer has been formed on the outer peripheral end surface of the ceramic disc, the layer on such surface was removed by grinding.

With respect to the samples thus obtained, the respective electric characteristics of the dielectric constant (ε), the quality factor (Q) and the temperature coefficient of the dielectric constant (TC) were measured at the temperature of 20° C. The result of the measurement is shown in Table 2.

Referring to Tables 1 and 2, the samples marked with an asterisk (*) are those obtained not in accordance with the present invention and those other than the samples marked with an asterisk are those obtained in accordance with the present invention.

TABLE 1

| Sample No. | $SrTiO_3$ (wt %) | $CaTiO_3$ (wt %) | $Bi_2O_3$ or $Bi_2O_3.nTiO_2$ (wt %) | $MgTiO_3$ (wt %) |
|---|---|---|---|---|
| 1* | 63 | 34.5 | $Bi_2O_3.2TiO_2$:2.5 | — |
| 2 | 64.5 | 33 | $Bi_2O_3$:2.5 | — |
| 3 | " | " | $Bi_2O_3TiO_2$:2.5 | — |
| 4 | " | " | $Bi_2O_3.2TiO_2$:2.5 | — |
| 5 | " | " | $Bi_2O_3.2TiO_2$:2.5 | 5 |
| 6* | " | " | $Bi_2O_3.2TiO_2$:2.5 | 13 |
| 7 | " | " | $Bi_2O_3.4TiO_2$:2.5 | — |
| 8 | " | " | $Bi_2O_3.5TiO_2$:2.5 | — |
| 9* | " | " | $Bi_2O_3.6TiO_2$:2.5 | — |
| 10 | 66.5 | 29 | $Bi_2O_3.4TiO_2$:4.5 | — |
| 11* | 66.5 | 28 | $Bi_2O_3.4TiO_2$:5.5 | — |
| 12 | 66.5 | 31 | $Bi_2O_3.2TiO_2$:2.5 | — |
| 13 | " | " | $Bi_2O_3.4TiO_2$:2.5 | — |
| 14 | 67.5 | 29 | $Bi_2O_3$:3.5 | — |
| 15 | " | " | $Bi_2O_3.2TiO_2$:3.5 | — |
| 16 | 68.5 | 29 | $Bi_2O_3.TiO_2$:3.5 | — |
| 17 | " | " | $Bi_2O_3.2TiO_2$:2.5 | — |
| 18 | " | " | $Bi_2O_3.2TiO_2$:2.5 | 8 |
| 19 | 69.5 | 29 | $Bi_2O_3.4TiO_2$:1.5 | — |
| 20* | 70.5 | 29.5 | 0 | — |

TABLE 2

| Sample No. | ε | Q | TC (× 10⁻⁶/°C.) |
|---|---|---|---|
| 1* | 228 | 1800 | −1160 |
| 2 | 284 | 4300 | −970 |
| 3 | 273 | 4900 | −910 |
| 4 | 269 | 5100 | −850 |
| 5 | 265 | 5300 | −800 |
| 6* | 212 | 6500 | −760 |
| 7 | 253 | 5600 | −870 |
| 8 | 241 | 6100 | −840 |
| 9* | 232 | 5900 | −920 |
| 10 | 267 | 2600 | −630 |
| 11* | 315 | 1800 | −710 |
| 12 | 294 | 5400 | −590 |
| 13 | 272 | 6300 | −650 |
| 14 | 305 | 2600 | −580 |
| 15 | 295 | 3200 | −690 |
| 16 | 293 | 4700 | −780 |
| 17 | 287 | 5100 | −830 |
| 18 | 268 | 5500 | −760 |
| 19 | 238 | 4700 | −920 |
| 20* | 230 | 250 | −1640 |

Figure 2:
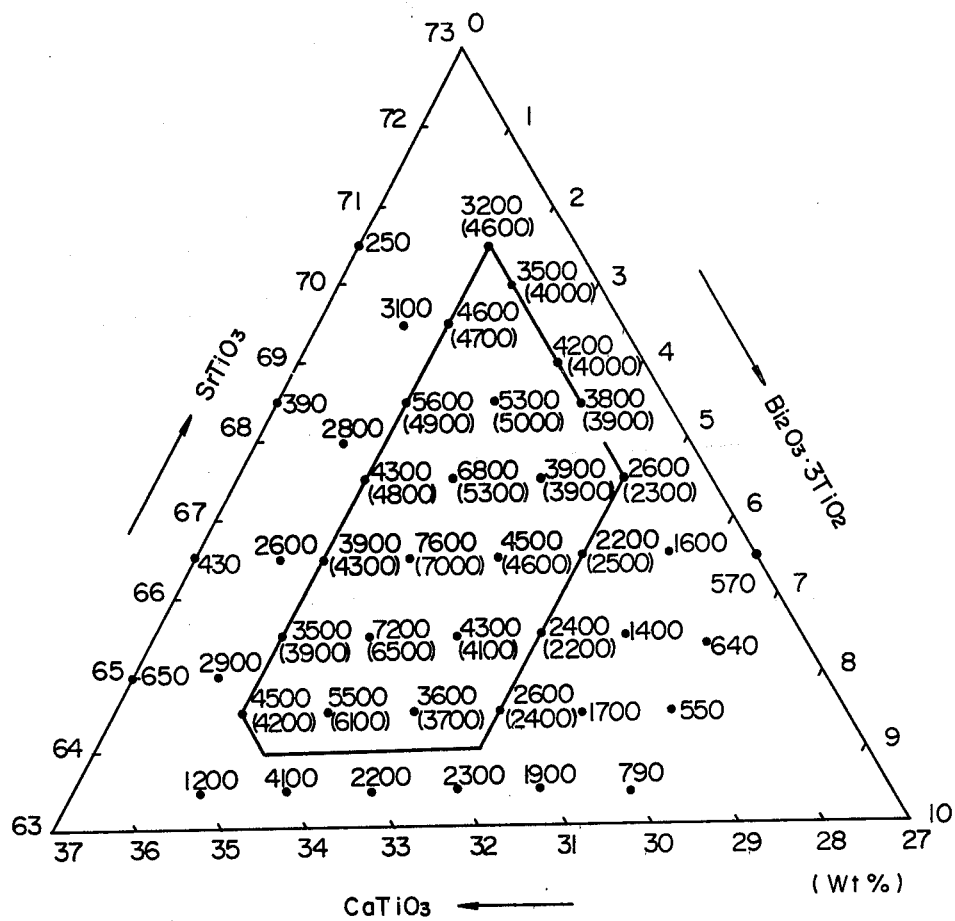
FIG. 2 is a triangular diagram showing a quality factor (Q) at the respective composition points in a composition including $SrTiO_3$—$CaTiO_3$—$Bi_2O_3.3TiO_2$.
Figure 3:
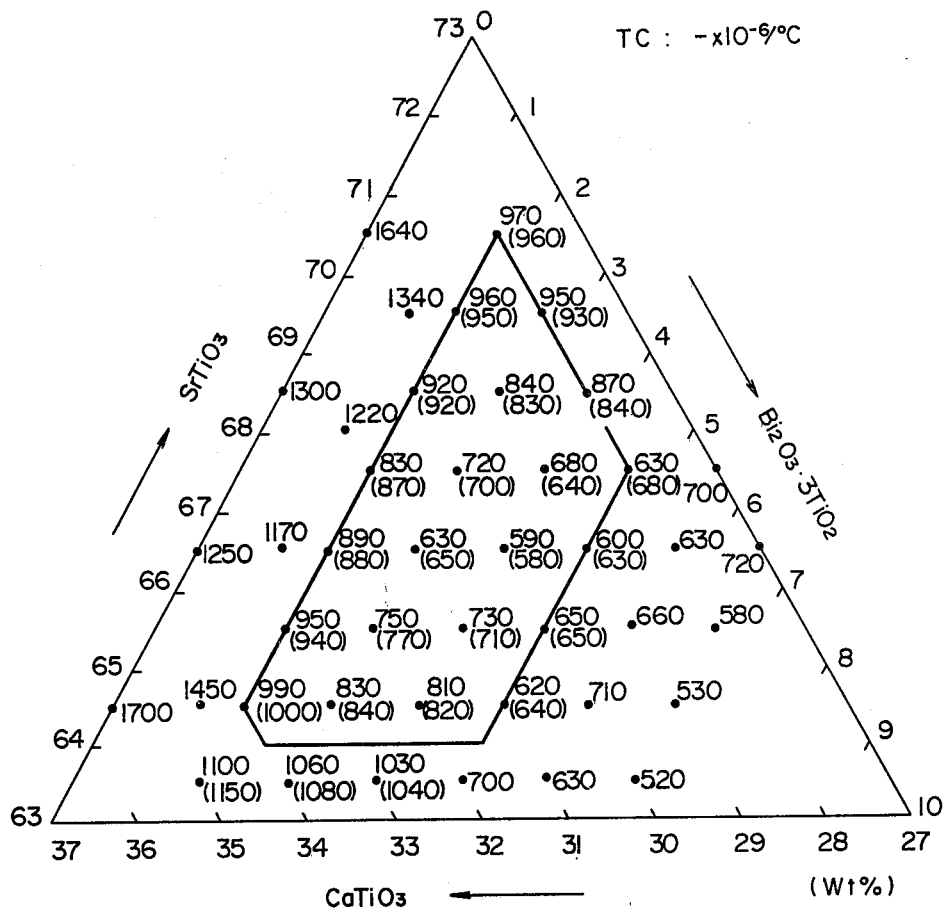
FIG. 3 is a triangular diagram showing a temperature coefficient of a dielectric constant (TC) at the respective composition points in a composition including $SrTiO_3$—$CaTiO_3$—$Bi_2O_3.3TiO_2$.

FIGS. 1, 2 and 3 are triangular diagrams showing the dielectric constant (ε), the quality factor (Q) and the temperature coefficient of a dielectric constant (TC), respectively, at the respective composition points of a composition including $SrTiO_3$—$CaTiO_3$—$Bi_2O_3.3TiO_2$. Referring to the figures, those shown in parentheses among the respective measured values are those obtained by measurement using electrodes of fired silver.

Figure 4:
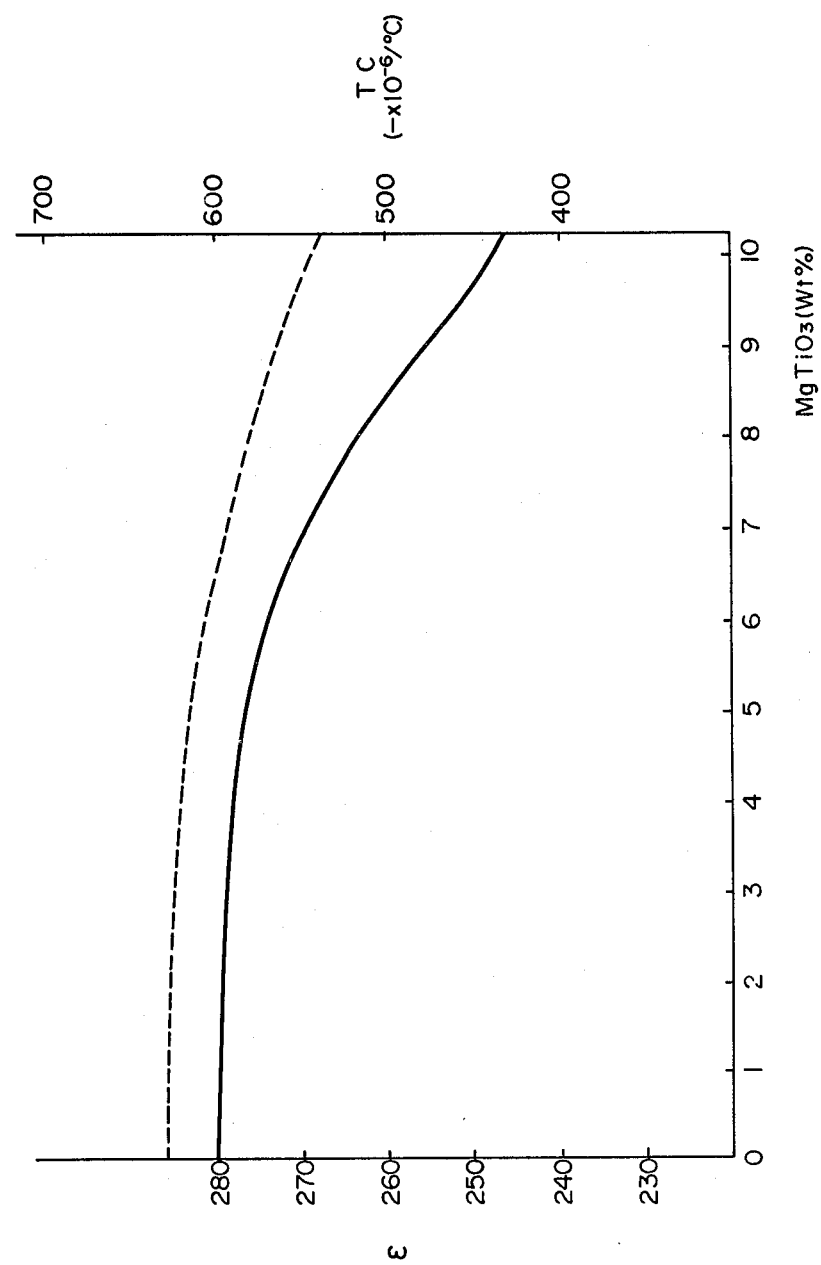
FIG. 4 is a graph showing a relation between the dielectric constant ($\epsilon$) and the temperature coefficient of a dielectric constant (TC) if and when $MgTiO_3$ is added to $SrTiO_3$—$CaTiO_3$—$Bi_2O_3.3TiO_2$.

FIG. 4 is a graph showing a change of the dielectric constant (ε) and the temperature coefficient of a dielectric constant (TC) when $MgTiO_3$ is added to a composition comprising 66.5% by weight of $SrTiO_3$, 31% by weight of $CaTiO_3$ and 2.5% by weight of $Bi_2O_3.3TiO_2$, in which the solid line denotes the dielectric constant (ε) and the dotted line denotes the temperature coefficient of a dielectric constant (TC).

Figure 5:
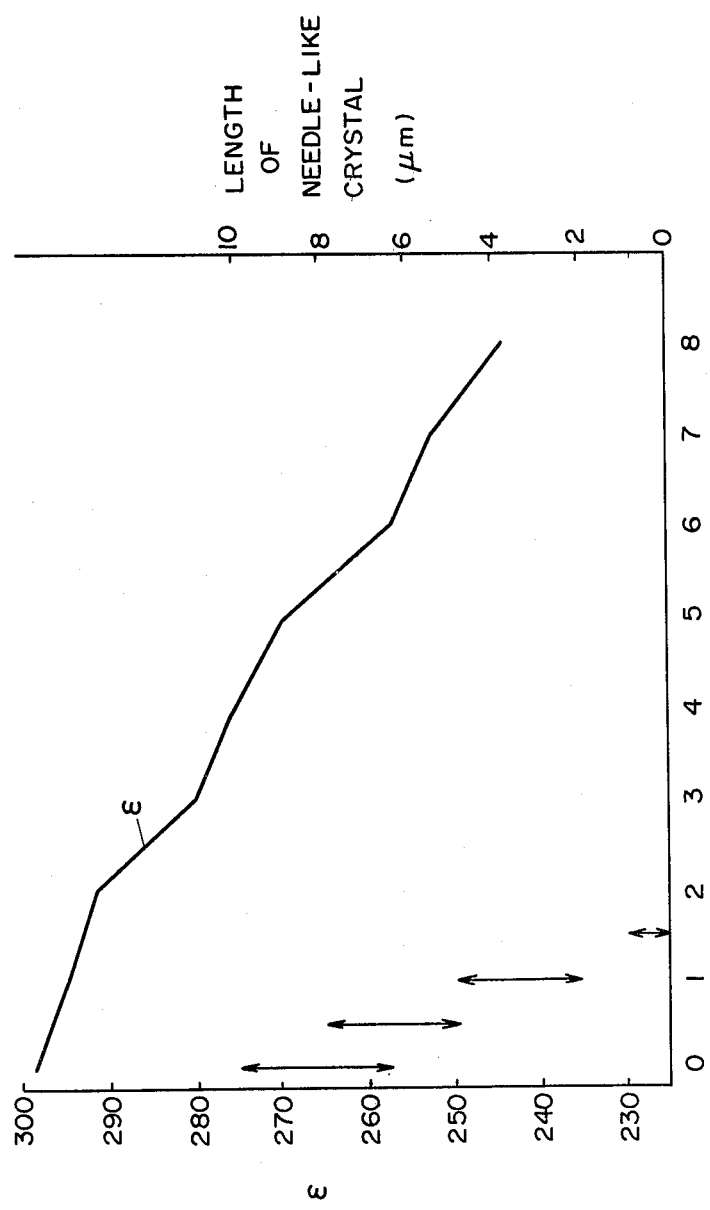
FIG. 5 is a graph showing a relation between the dielectric constant (ε) and the length (μm) of a needle-like crystal when n of $Bi_2O_3.nTiO_2$ is changed.

FIG. 5 is a graph showing an influence upon the dielectric constant (ε) caused by a change of n of $Bi_2O_3.nTiO_2$ in a composition comprising 66.5% by weight of $SrTiO_3$, 31% by weight of $CaTiO_3$ and 2.5% by weight of $Bi_2O_3.nTiO_2$. The length (μm) of a needle-like crystal formed on the ceramic surface was simultaneously measured.

As seen from Tables 1 and 2 and FIGS. 1 to 3, by selecting the values in the ranges in accordance with the present invention, that which has an excellent characteristic of the dielectric constant (ε) being at least 235, of the quality factor (Q) being at least 2000 and of the temperature coefficient of a dielectric constant (TC) being up to $-1000 \times 10^{-6}$/°C. was obtained. Furthermore, by selecting the values in the ranges in accordance with the present invention, a composition of an electric characteristic of little diversification is provided even in case of electrodes of fired silver or electrodes of electroless plating. Accordingly, inexpensive electroless plating electrodes can be formed and the cost can be advantageously reduced.

As is further seen in FIG. 5, by inclusion of $Bi_2O_3.nTiO_2$ in $SrTiO_3$—$CaTiO_3$, and increasing the amount of $TiO_2$ in such case, production a needle-like crystal on the surface of ceramic can be suppressed and the adhesiveness of electroless plating electrodes to the surface of ceramic is improved.

Furthermore, by adding a mineralizer of such as $SiO_2$, $Al_2O_3$, $MnO_2$, $Fe_2O_3$ or the like to the inventive composition, the ease of sintering can be further enhanced.

Although $SrTiO_3$, $CaTiO_3$, $MgTiO_3$ were in advance prepared in the above described examples, alternatively raw materials of $SrCO_3$, $CaCO_3$, $MgCO_3$ may be used and the same may be admixed with $Bi_2O_3$, $TiO_2$ and then may be subjected to calcination.

Japanese Patent Publication No. 17771/1981 described above discloses a composition including $Bi_2O_3.3TiO_2$ included as a secondary constituent in $SrTiO_3$—$CaTiO_3$ and the same points out that whereas the dielectric constant ($\epsilon$) is increased, the quality factor (Q) and the temperature coefficient of a dielectric constant (TC) are degraded. However, as a result of research made in conjunction with the present invention, not only the electric characteristic of the same level as compared with the $SrTiO_3$—$CaTiO_3$—$Nb_2O_5$ system can be attained in the specified range of composition, but also the above described characteristics can be secured by electroless plating electrodes as well as by electrodes of fired silver, with the result that the present invention is extremely effective in industrial production of the composition.

What is claimed is:

1. A temperature compensating ceramic capacitor comprising a ceramic dielectric composition for temperature compensation consisting essentially of 64 to 70.5% by weight of $SrTiO_3$, 28 to 34% by weight of $CaTiO_3$, and 1.5 to 4.5% by weight of $Bi_2O_3$ or $Bi_2O_3.nTiO_2$ (where n=1 to 5), said composition having a dielectric constant above 235, Q above 2,000 and a temperature coefficient of a dielectric constant up to $-1000\times10^{-6}/°C.$, and nickel or copper electroless metal electrodes attached to said commposition.

2. The temperature compensating ceramic capacitor of claim 1 wherein said ceramic dielectric composition for temperature compensation contains $MgTiO_3$ in an amount of not more than 10% by weight.

3. The temperature compensating ceramic capacitor of claim 2 wherein said electroless metal electrodes are nickel electroless metal electrodes.

4. The temperature compensating capacitor of claim 2 wherein said electroless metal electrodes are copper electroless metal electrodes.

5. The temperature compensating ceramic capacitor of claim 1 wherein said ceramic dielectric composition for temperature compensation consists essentially of 64.5–69.5% by weight $SrTiO_3$, 29–33% by weight of $CaTiO_3$ and 2.5–3.5% by weight of $Bi_2O_3$.

6. The temperature compensating ceramic capacitor of claim 1 wherein said dielectric composition for temperature compensation consists essentially of 64.5–69.5% by weight of $SrTiO_3$, 29–33% by weight of $CaTiO_3$ and 1.5 to 4.5% by weight of $Bi_2O_3.nTiO_2$ (where n=1 to 5).

7. The temperature compensating ceramic capacitor of claim 6 wherein said ceramic dielectric composition contains 5–8% by weight of $MgTiO_3$.

8. The temperature compensating ceramic dielectric of claim 1 wherein the amount of $SrTiO_3$ is 64.5% by weight and the amount of $CaTiO_3$ is 33% by weight.

9. The temperature compensating capacitor as of claim 8 wherein the amount of $Bi_2O_3$ or $Bi_2O_3.nTiO_2$ is 2.5% by weight.

10. The temperature compensating ceramic dielectric of claim 1 wherein the amount of $SrTiO_3$ is 66.5% by weight and the amount of $CaTiO_3$ is 29% by weight.

11. The temperature compensating ceramic dielectric of claim 1 wherein the amount of $SrTiO_3$ is 66.5% by weight and the amount of $CaTiO_3$ is 31% by weight.

12. The temperature compensating ceramic dielectric of claim 1 wherein the amount of $SrTiO_3$ is 67.5% by weight and the amount of $CaTiO_3$ is 29% by weight.

13. The temperature compensating dielectric ceramic of claim 1 wherein the amount of $SrTiO_3$ is 68.5% by weight and the amount of $CaTiO_3$ is 29% by weight.

14. The temperature compensating ceramic dielectric of claim 1 wherein the amount of $SrTiO_3$ is 69.5% by weight and the amount of $CaTiO_3$ is 29% by weight.

* * * * *